Dec. 5, 1950
D. M. WILLIAMS
2,533,076
APPARATUS FOR TESTING THE ADHESION
OF FILMS OF COATING MATERIAL
Original Filed May 24, 1944
5 Sheets-Sheet 1
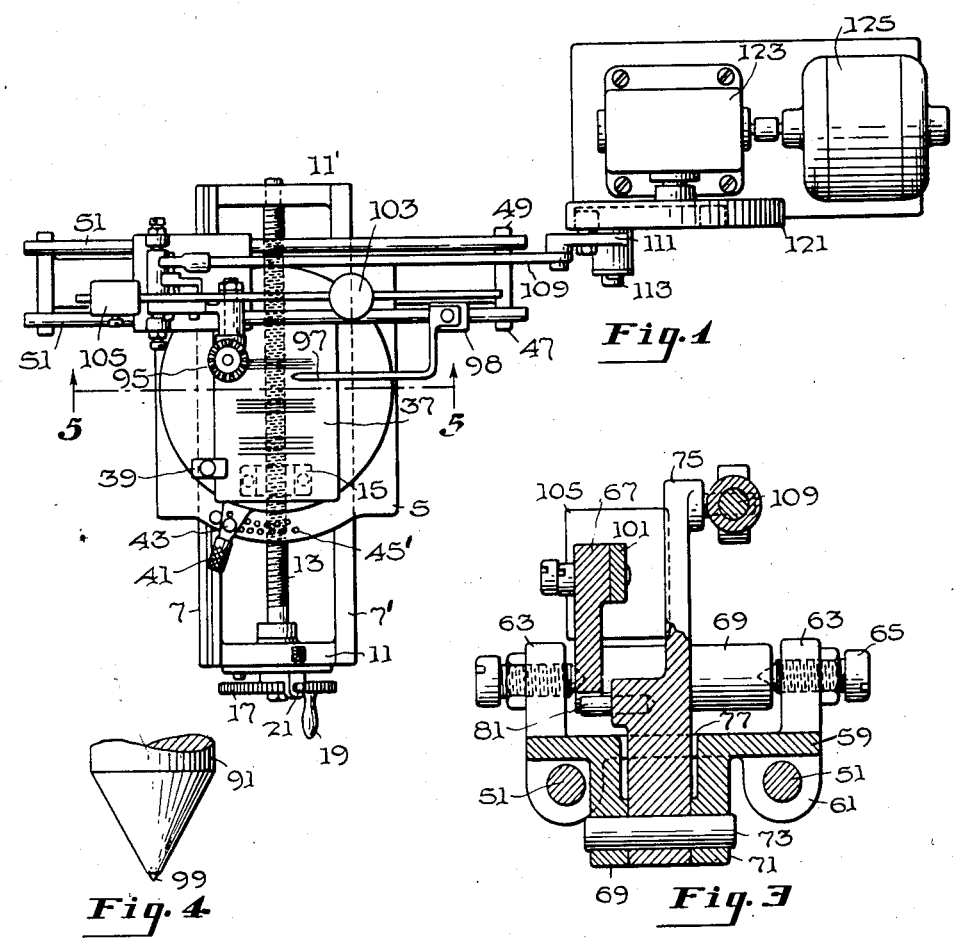
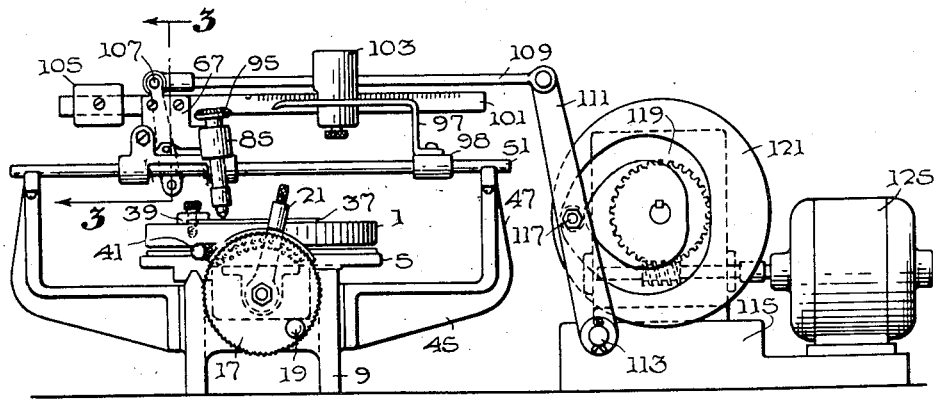

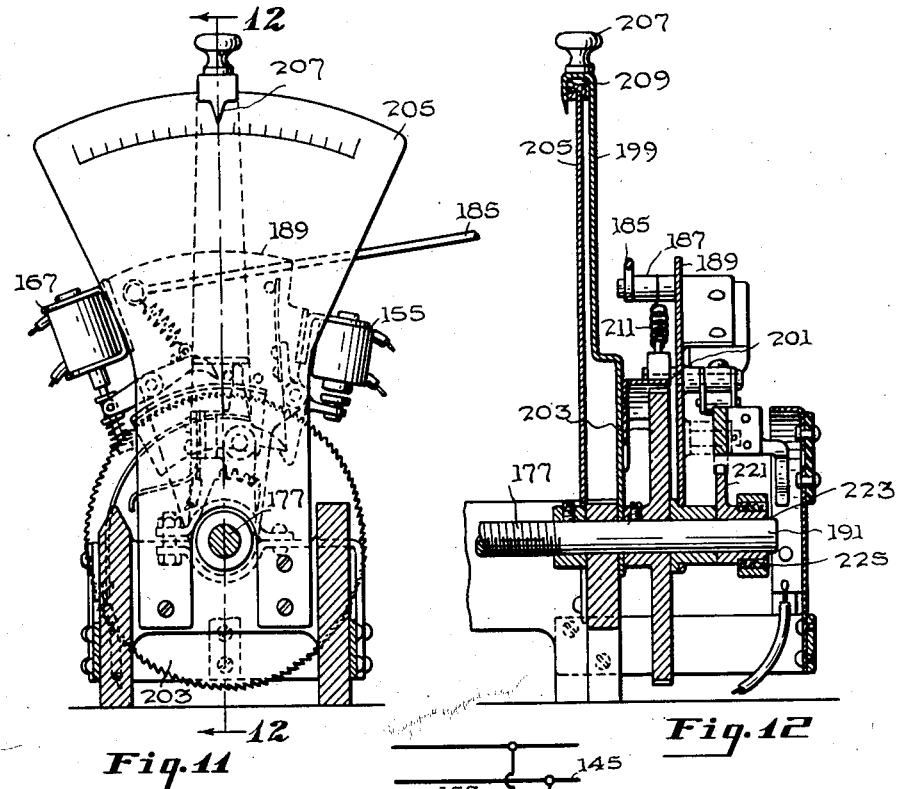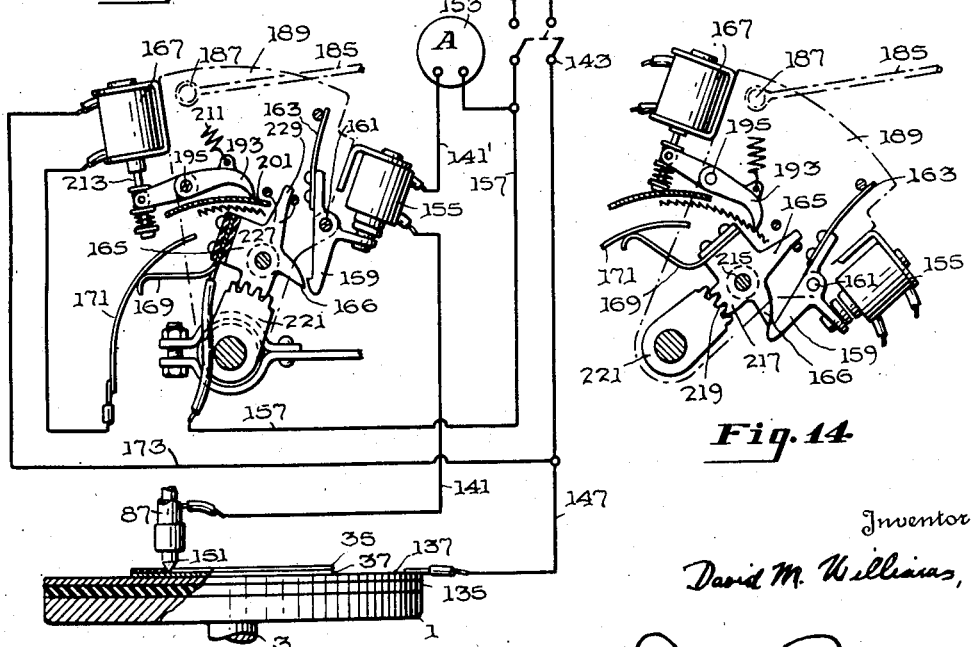

Dec. 5, 1950　　　　　D. M. WILLIAMS　　　　2,533,076
APPARATUS FOR TESTING THE ADHESION
OF FILMS OF COATING MATERIAL
Original Filed May 24, 1944　　　　　5 Sheets-Sheet 5

Inventor
David M. Williams,
By Leech & Radue,
Attorneys

Patented Dec. 5, 1950

2,533,076

UNITED STATES PATENT OFFICE 2,533,076

APPARATUS FOR TESTING THE ADHESION OF FILMS OF COATING MATERIAL

David M. Williams, Warrensville Heights, Ohio, assignor to The Arco Company, Cleveland, Ohio Original application May 24, 1944, Serial No. 537,132. Divided and this application May 14, 1945, Serial No. 593,689

15 Claims. (Cl. 73—150)

This invention relates to apparatus for testing the adhesion characteristics of surface films, particularly films of coating materials such as paints, lacquers, flowable res'ns and the like, adhering to solid surfaces. This application is a divisional application of Serial No. 537,132, filed May 24, 1944, now Patent No. 2,431,974 entitled "Method of Testing the Adhesion of Coating Material." More particularly the present apparatus for carrying out the invention pertains to a unique system and mechanism for testing the adhesive qualities of films formed on metallic test pieces, whereby the lateral stress adhesion of the film is mechanically measured to ascertain the bond between the coating and the subsurface on which the coating is applied by applying a known standard stress to a decreasing area of adhesion interface until the bond is destroyed. In following this improved method of testing the adhesive qualities of coating compositions, as disclosed and claimed in Patent No. 2,431,974, a plurality of parallel or bisecting lines or grooves are formed through the coating film of decreasing spacing until the lateral stress placed on the intervening coating material between the lines or grooves displaces the material to thus determine the mechanical measure of the bond between the paint coating and the subsurface on which it is applied. In generating the grooves or lines through the film the displacement force created in forming the lines or grooves is transmitted to the adhesion interface by the film itself, and in normal cases the cohesion of the film is greatly in excess of the adhesion properties thereof, and consequently the known lateral stress used in the grooving operation is a measure of the adhesion of the film. This application of force through the cohesion of the film enhances the practical value of the present lateral stress adhesion method and the data adduced from the operation of the apparatus, since scrapes, punctures or scratches also use the film structure to cause adhesion failures. The tensile or pull determinations of adhesion have little practical value.

The invention as herein described and claimed encompasses an apparatus for readily carrying out the adhesion testing of the paint films and the like, and this apparatus comprises generally a machine whereby a paint film on a test piece is cut or grooved through the film to the metal base. Whereafter it forms a plurality of these cuts or grooves through the film in parallel or bisecting relation and of decreasing width between the cuts or grooves. In other words, the test lines formed through the film to the metal base are formed successively closer together, and if the film is not torn up between the lines a new series of grooves is made with a slightly closer spacing, and this is continued until the strip of film between the grooves is displaced by reason of the lateral stress applied in forming the grooves and the adhesive bond between the paint coating and subsurface is destroyed. The cutting or grooving tool is moved through the film under a predetermined stress or weight which can be readily measured to obtain standardized data for various test pieces.

In the drawings Figs. 1 to 6 illustrate an adhesion testing machine where the operator manually selects the spacing of grooves on the test piece during the course of operation.

In these figures:

Fig. 1 is a plan view of the apparatus showing the grooving operation;

Fig. 2 is a side elevational view of the apparatus shown in Fig. 1;

Fig. 3 is an enlarged vertical section taken on line 3—3 of Fig. 2;

Fig. 4 is an enlarged detail view of the cutting or grooving tool;

Figure 7:
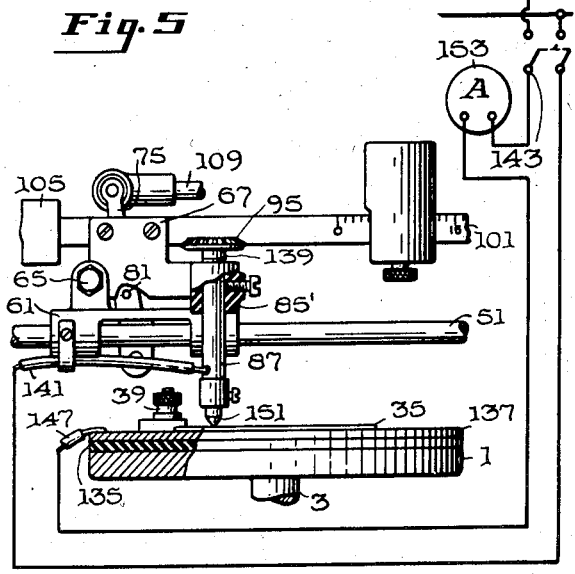
Figure 8:
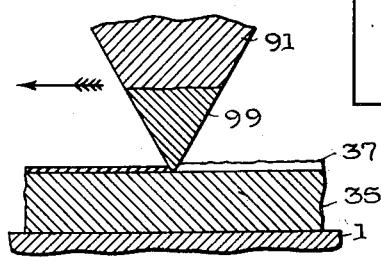
Figure 9:
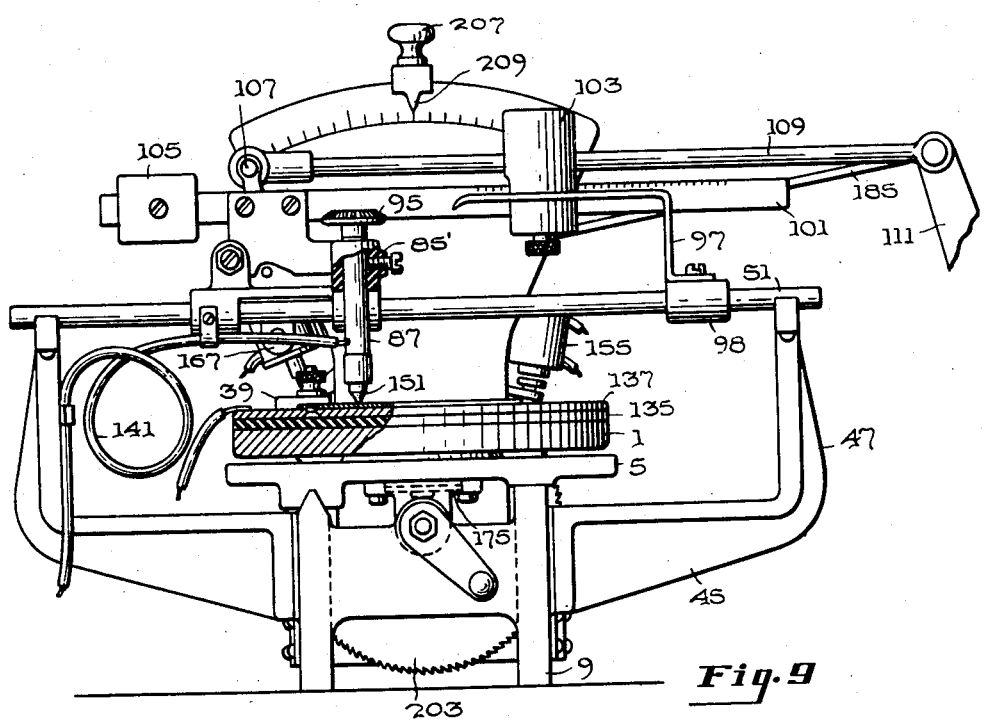
Figure 10:
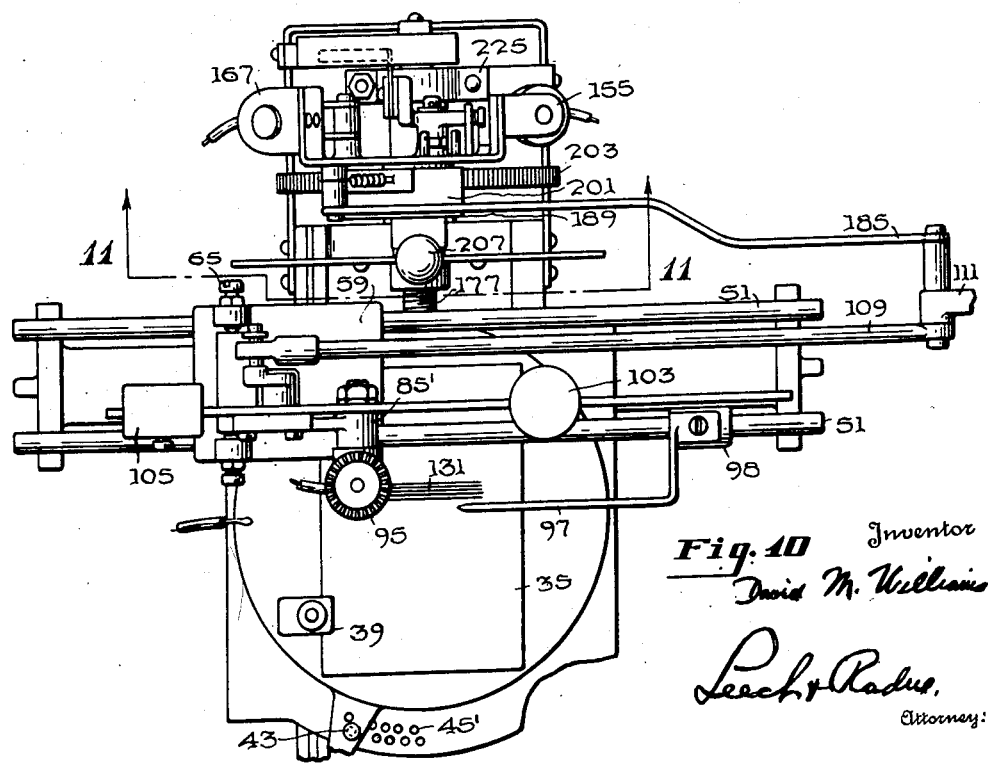

Figs. 7 to 16, inclusive, show a modified form of the invention wh'ch is electrically controlled, wherein Fig. 7 is a detail of the modified form of grooving tool and electric circuit under control of the tool when the tool has penetrated through the test film and is in contact with the metal;

Fig. 8 is an enlarged view of the modified cutting tool for forming the electrical contact with the test piece;

Fig. 9 is a front elevational view of the modified or automatic form of machine in which each line or groove is automatically spaced from the adjacent preceding line;

Fig. 10 is a plan view of the apparatus shown in Fig. 9;

Fig. 11 is an elevational sectional view taken on line 11—11 of Fig. 10 and showing the automatic and electrical spacing mechanism;

Fig. 12 is a vertical section taken on line

Figure 15:
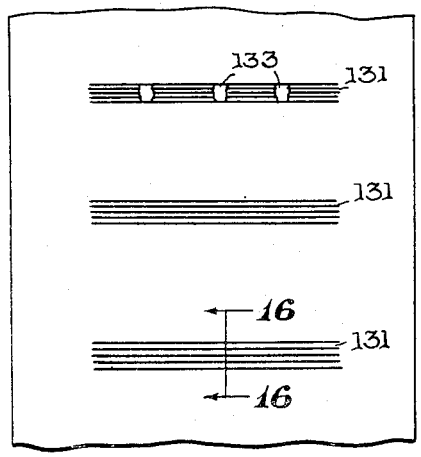
Figure 17:
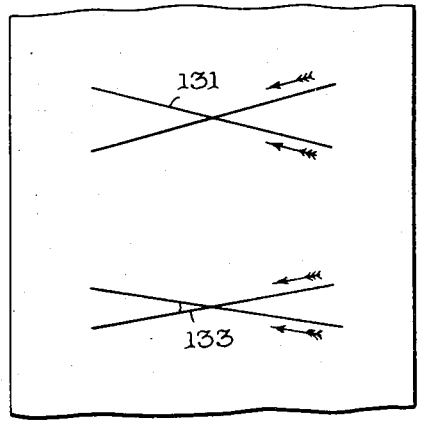
Figure 16:
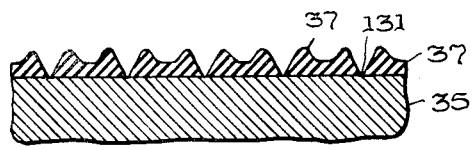

12—12 of Fig. 11 of the automatic spacing device;

Fig. 13 is a diagrammatical view showing the spacing device at one point of its operation and the electrical circuit therefor;

Fig. 14 is a detail of the control elements of the automatic spacing device at the end of the spacing stroke;

Fig. 15 is a plan view showing a sample specimen with several series of grooves cut in the test plate and showing the series of grooves with different spacings therebetween;

Fig. 16 is an enlarged section taken on line 16—16 of Fig. 15, showing the grooves formed completely through the test film to the metal base; and Fig. 17 is a modified groove formation where the test cuts bisect one another.

In the form of manually controlled apparatus shown in Figs. 1 to 7, inclusive, numeral 1 denotes the test table or specimen support rotatively mounted on a central pin 3 carried by a slidable support 5 mounted for movement on spaced apart parallel rails 7—7' formed on the top of the machine base 9. The ends of the rails 7—7' are connected by cross pieces 11—11' through which a rotatable feed screw 13 is journalled. The feed screw 13 is threaded through a threaded nut or tube 15 secured to the under side of the slidable test table support 5 for moving the same. At the front of the machine the feed screw 13 is attached to and adapted to be rotated by a ratchet wheel 17 having a handle 19. Limited rotary movement may be given the ratchet wheel 17 and associated feed screws 13 by engagement of the teeth thereof by the spring pressed plunger 19' carried in the outer end of a pivoted lever 21 which is journalled on the feed screw 13 between the cross pieces 11 and the ratchet wheel 17. Thus when the plunger 19 is in engagement with the ratchet wheel 17 and the lever 21 is moved clockwise the feed screw 13 is rotated and the nut 15 on the slidable support 5 carrying the test table 1 will be moved along the rails 7—7'. The amount of rotative movement of the ratchet wheel 17 is controlled by the setting of a stop pin 23 which is adjustably positioned in the openings 25 formed in the indexing segment 27, while retrograde movement is limited by fixed stop pin 29.

The test piece is preferably made up of a metal sheet 35 having a hardened film of paint or other coating material 37 thereon, and the test piece is positioned on the top of the adjustable testing table 1 by means of a clamp 39. The test table is held in adjusted position by the offset handle 41 having a pin 43 therein for engagement with the desired opening 45' formed in the edge of the slidable support 5.

Figure 5:
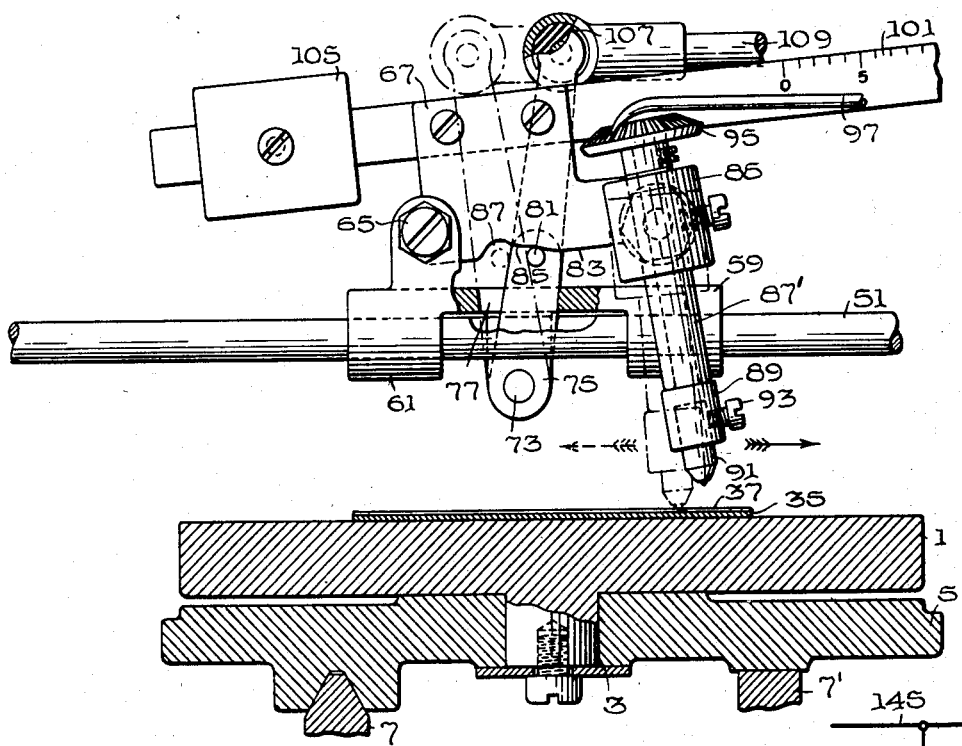
Fig. 5 is an enlarged elevational view taken on line 5—5 of Fig. 1 and showing the cutting tool at the end of its return stroke and about to begin a cutting stroke.
Figure 6:
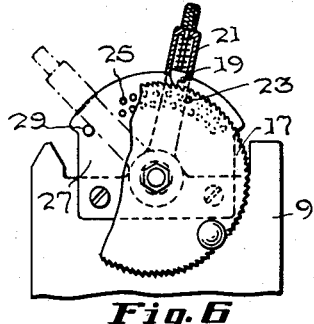
Fig. 6 is an enlarged elevational view of the spacing or indexing wheel which is manually operated for spacing the distances between the grooves cut by the tool.

As shown in Figs. 1 and 2, the base 9 of the machine is provided with a pair of extending arms 45 each having a vertical section 47 supporting a horizontal cross bar 49 for holding a pair of parallel track rods 51 on which the slidable carriage of the grooving tool is mounted. The details of construction of the tool carriage is shown in Figs. 3 and 5, and as shown the carriage per se comprises a slidable horizontal plate 59 having four spaced depending tubular sections 61 through which the track rods 51 pass. Secured to the upper face of the slidable horizontal plate 59 at one end thereof is a pair of vertical arms 63 fitted with inwardly extended screw threaded bearing bolts 65 between which is supported a vertical pivot plate 67. As shown in Fig. 3, the rear of the plate 67 is provided with a tubular extension 69 to bridge the gap between the vertical arms 63 and the bearing screws 65. A pair of depending spaced parallel arms 71 extend downwardly from the plane of the slidable plate 59 to form a holding means for a transverse axle pin 73 on which a vertically extending pivot arm 75 oscillates. This upwardly extending arm 75 passes through an opening 77 formed in the slidable horizontal plate 59 and the opening is of such a size that it restricts movement of the vertical arm 75 through an angle of about 15°. An offset pin 81 is secured in the side of the arm 75 for engagement with the lower edge 83 of the vertically pivoted plate 67. As seen in Fig. 5 the lower edge 83 of the plate 67 is provided with an inclined portion 85 and an adjacent indented portion 87 so that when the arm 75 is in dotted line position the pin 81 does not contact the lower edge 83 of the plate 67, but upon clockwise oscillation thereof the pin 81 will ride on the cam surface 85 as shown in the solid line position to lift the right end of plate 67.

The tool holder comprises a cylinder 86 bolted to the outer end of the vertical pivot plate 67 and carries therethrough a rotatable rod 87' having a socket 89 in the lower end thereof for the detachable insertion of a grooving tool 91 secured in position by set screw 93. The upper end of the rotatable tool holding rod 87' is provided with a pinion 95 which cooperates with the end of hooked rod 97 secured to one of the track bars 51 by an adjustable sleeve 98 for turning the same at the end of the return stroke of the carriage 59, as will be hereinafter described. The grooving or cutting tool 91 is preferably provided with a conical diamond tip 99, although other types of hard cutting tips may be used. The cutting tool is rotated slightly after each cutting stroke by means of the pinion 95 and hooked rod 97, so that for each stroke a new cutting surface is presented and thus the life of the tip is increased.

Secured to the top edge of the vertical plate 67 of the tool carriage is a graduated scale arm 101 having a slidable weight 103 thereon for adjustable positioning along the scale arm while a counterweight 105 is secured on the opposite end of the scale arm 101 and the parts are so arranged that when the adjustable weight 103 is set at the zero point on the scale the counterweight 105 will just balance the pivoted portions of the tool carriage. The adjustable weight 103 can thus be positioned along the scale rod to place a predetermined pressure or load on the cutting tool point 99 during the period of its grooving movement. To reciprocate the tool carriage the upper end of the vertically pivoted arm 75 is pivoted through an anti-vibration bushing 107 to push rod 109 which is pivotally connected to a pitman 111, whose lower end embraces a pivot pin 113 secured to the base 115. A follower 117 is secured to an intermediate portion of the pitman 111 and rides within the groove 119 of the cam disk 121. Rotative movement is given to cam 121 through reduction box 123 driven by motor 125. Consequently when the motor 125 is operated, the cam 121 will be rotated and the follower 117 carried around the cam groove 119 to reciprocate the push rod 109 and move the tool carriage 59 back and forth across its plate 35. As shown in detail in Fig. 5 the cutting action of the tool 91 through the film 37 on the test plate 35 is accomplished during the period that the push rod 109 and the tool carriage are moving toward the left as indicated in dotted lines. The movement of the tool carriage to the right on the return stroke raises the tool from contact with its film as shown in the solid line portion of the figure. This action is secured by reason of the pivotal movement of the vertical arm 75 in cooperation with the pin 81 and cam surface 85 formed on the lower edge of pivot plate 67. The opening 77 formed in the horizontal portion 59 of the carriage which provides for freeing the arm 75 from the carriage at the end of the cutting stroke and before the non-cutting return stroke is proportioned to give a lost motion connection whereby when the push rod 109 moves the carriage to the left the pin 81 is out of contact with the edge 85 and is within the cut-away portion 87 and the tool 91 is in contact with the test plate. After the cutting stroke, which is preferably about two inches in length, the rotation of the follower in the cam groove reverses the movement of the push rod 109 through the lost motion connection previously mentioned. Then lever 75 is moved to the opposite side of the opening 77, whereupon the pin 81 rides up the cam surface 85 formed on the lower part of the plate 83 and raises the plate 67 on its pivot bolts 65, and thus during the return movement of the carriage the tool carried by the plate is lifted and out of contact with the test piece. Further rotation of the cam plate 121 and its associated mechanism repeats the cycle just described.

The setting of the pin 23 on the indexing plate 27 permits the operator to feed the test plate table 1 through the contact of the dog 19 with the ratchet teeth on wheel 17 to slide the plate slightly, whereupon as the tool 91 is reciprocated a further cut is made in the material to be tested. Figs. 1 and 15 show a test plate which has been grooved with a series of test cuts 131 through the film 37 with each series of test cuts of lesser spacing from one another than the preceding series. This closing or reduction of the spacing between the several test grooves by decreasing the spacing between the cuts in each series is continued until the grooves are so close to one another that the lateral stress placed upon the film in cutting the groove is sufficient to break the bond between the narrow strip of film and the model test surface, and inasmuch as the operator knows the weight placed on the tool he is able to determine, through listing the various variables present, the adhesive characteristics of the film. The enlarged view of a series of test grooves 131 as shown in Fig. 15, includes an illustration of patches 133 between the closely positioned grooves from which the paint has been laterally displaced. It will be obvious that any suitable data can be charted by the operator so as to give a basis for testing the various films of coating materials. In Fig. 16 there is shown a greatly enlarged cross-section of the form of grooves 131 and intermediate film 37 made by the cutting tool after it has penetrated the film and is in contact with the test surface 35.

In initiating the first test groove 131 through the film 37 the tool point 99 may be moved across the test surface a number of times until the hard point of the tool contacts the test plate or an initial groove 131 having sufficient pressure to cut through the film 37 can be accomplished by increasing the pressure on the tool point by adjusting the slidable weight 103. As before stated, the end of the hooked rod 97 moves the pinion 95 slightly near the end of each return stroke to rotate the tool shaft 87 a few degrees so that the life of the cutting tool 99 is prolonged. To prevent chatter or undue vibration the cutting position of the tool is tilted slightly, generally 5 degrees from the perpendicular.

In the modified form of apparatus shown in Figs. 7 to 14, inclusive, the grooves 131 are cut through the test film 37 and spread automatically without manual operation of the groove spacing ratchet wheel and feed means. In these figures of the modified machine like parts of the manually operated machine of Figs. 1 to 7 have been similarly identified. The driving unit comprising the cam 121, reduction gearing 123 and motor 125 are not shown. As before stated the actual testing of the adhesion of the film 37 cannot properly take place until the cutting point of the tool has penetrated the film and is in contact with the base plate 35. This is taken advantage of in the modified machine by having the tool point of electrical conducting material so that an electrical circuit is completed when the tool point contacts the base plate to energize an automatic feed arrangement whereby the test table is moved along its ways and the tool cuts successive grooves in the film being tested. To insulate the several parts of the machine the tool holding cylinder 85′ is made of dielectric and an insulating plate 135 is placed under the test plate holder 137 on the table 1, see Fig. 7. The cutting tool holder 87 is preferably insulated by a dielectric washer 139 from the pinion 95 while the holder 87 is connected by conductor 141 to one side of a switch 143 which when closed completes a circuit with power line 145. The other line of the switch 143 is connected through conductor 147 with the conducting plate 137 underlying the metal test plate 37. Thus with switch 143 in closed position it is connected through conductor 147 with the conducting plate 137 underlying the metal test plate 37. Thus with the switch 143 in closed position an electrical circuit is completed when the point of the all metal grooving tool 151 has cut through the test film 35 and contacts the plate 37, see Fig. 7. Continuity of the circuit is observed on a meter 153 and as contact is made by the tip of the tool 151 with the metal plate and recorded on meter 153 two further circuits are completed. The first circuit includes the solenoid 155 placed in the line 141, 157, through the meter 153 and joined to the line 157 leading to the switch 143, the other portion of the circuit includes the plate 137, and line 147, so that when contact is made by grooving tool 151 the solenoid 155 will be energized and the latch 159 pivoted at 161 and biased by spring 163 will be drawn or released from latched position from finger 166 of pivoted brush holder 165. The circuit of the second solenoid 167 is controlled by contact brush 169 secured to pivoted brush holder 165 and connected to conductor 157, so that when contact brush 169 is in contact with contact strip 171 connected to the solenoid 167 the circuit from the solenoid 167 in completed through conductor 173 joined to line 143. This portion of the apparatus is for the purpose of automatically rotating feed screw 177 to advance the test table 1 whereby successive test grooves are made in the test panel.

In the modified views, Figs. 7 to 14, inclusive, a connecting rod 185 is attached at one end to the reciprocating arm 111 of the drive unit while the opposite end is attached through stud 187 to a vertical arcuate segment 189 pivoted on the rear extension 191 of the feed screw 177. The solenoids 155 and 167 are also secured to the segment 189 and move therewith as does the dog 193 pivoted on stud 195 fastened to the front face of the segment.

Also pivotally connected to the end portion 191 of feed screw shaft 177 is a vertically extending arm 199 having an arcuately formed axially projecting segment 201 which normally lies over the upper portion of the ratchet wheel 203 that is attached by a set screw to the feed screw shaft. In spaced relation to the vertically extending arm 199 is a scale plate 205 provided with a central zero marking and graduated markings on either side thereof for cooperation with a pointer 207 carried on the depending part of the vertical arm 199 which carries over the dial plate 205. Movement is given the arm 199 by operation of a knob 207 secured thereto and to prevent any accidental movement of the arm friction packing 209 is placed in the upper U-shaped bent portion carrying the pointer 207 on either side of the dial plate 205. This unit of the device is not regularly connected to the end portion 191 of the feed shaft but is pivotally mounted thereon. As seen in Figs. 13 and 14 the axially extending arcuate shield 201 overlies the teeth on the ratchet wheel 203 and normally prevents the dog 193 from engagement therewith. However, until reciprocation is given the vertical segment 189 by means of the connecting rod 185 the dog 193 passes over the end of the shield 201 and engages the teeth of the ratchet wheel to move it in a clockwise direction when movement of the segment 189 is reversed and limited rotation is thus given to the feed shaft. This feed movement occurs only when the solenoid 167 is energized after the cutting tool 151 has made contact with the metal test plate 37. The end setting of the arcuate shield plate 201 is controlled by movement of the knob 207, and of course the greater the movement from the zero point the more teeth will be exposed on the ratchet wheel beyond the end of the shield. The teeth of the dog 193 are normally held out of engagement with the ratchet teeth not only by the shield 201 but by the tension of spring 211 attached to the dog through an eye and with its opposite end secured to the stud 187. When the solenoid 167 is energized the armature 213 is drawn up and the tension of spring 211 is overcome so that the dog 193 will pivot and engage a tooth on the ratchet wheel 203, as shown in Fig. 14, and hold the same until the entire assembly carried by segment 189 is oscillated by the connecting rod 185 and rotation imparted to feed screw 177.

It will be observed that the brush holder 165 is pivotally mounted on the stud 215 and has a plurality of teeth 217 formed on the lower edge thereof. These teeth engage similarly formed teeth 219 formed on the collar 221 which has an axial extension 223 loosely journalled on the end portion of the feed shaft. Movement of the collar 221 is restrained by a friction brake 225 secured to the base frame of the machine and engages the axial extension 223. Thus if during the first part of the ratchet or power stroke the solenoid 155 is energized the brush holder 165 is free to rotate slightly being limited by the two upper stop pins 227 lying on either side of the extension 229 thereof. Since movement of the collar 221 is restrained by the brake any movement of the segment 189 to the right will cause the brush holder 165 to tend to revolve clockwise and complete the electric circuit between the electric contact arms 169 and 171. However, as soon as clockwise movement of the brush holder 165 about its own pivot is stopped by one of the stop pins 227, the brush holder 165 and the collar 221 rotate as a unit above the feed screw along with the solenoids 155 and 167 and all other parts secured to the oscillating segment 189. It will be observed that relative movement between the brush holder 165 and collar 221, takes place during the "lost motion" period of the carriage operating rod 109 and before the cutting tool has been lifted off of the specimen. Thus, if current is flowing through solenoid 155 at or near the end of the cutting stroke then a feed movement takes place but not otherwise. On the return or back stroke of the feeding mechanism, the action of the brush holder 165 and collar 221 is reversed and solenoid 155 being deenergized the latch 159 is free to engage the lug on the brush holder, as shown in Fig. 14. During the "lost motion" period the brush on contact 159 is moved out of contact with arcuate contact 171 and thus allows dog 193 to be withdrawn from the ratchet wheel as the solenoid 167 is deenergized and the spring 211 lifts the engaging end 193 of the dog.

In use this automatic feeding mechanism permits the operator to move the handle 207 first to the left before a test is made, and then with the machine operating the handle is gradually moved to the right until the critical displacing point is observed. As soon as electrical contact is made, as heretofore described, the automatic table advancing mechanism moves the table of the machine and the spacing of the grooves is under the constant regulation of the operator by the positioning of the handle 207.

If desired, angular bisecting grooves may be generated in the paint film and the angle between the bisecting lines reduced until the adhesion of the paint is stressed to a degree that the film bond is destroyed as illustrated in Fig. 17.

I claim:

1. An apparatus for testing the adhesive characteristics of a film of coating material applied to a surface, comprising a reciprocable cutting tool adapted to intermittently and serially form grooves through the said film, means for moving the surface to which the film is applied to present an ungrooved film surface to the grooving action of the moving tool and mechanism to lift the tool from the surface during each return stroke whereby the said surface may be freely adjusted laterally of the path of the last groove.

2. An apparatus for testing the adhesive characteristics of a film of coating material applied to a panel comprising a slidable holder for said panel, a grooving tool, means connected to said tool for moving the same over said panel in contact with the coating material thereon in one direction and above said coating material in the opposite direction, a feed mechanism for adjusting the slidable holder laterally of the tool path after each grooving movement and means to regulate the amount of such adjustment.

3. An apparatus for testing the adhesive characteristics of a film of coating material applied to a panel comprising a movable table for supporting a panel, horizontal rails mounted above said table, a sliding carriage mounted for reciprocable movement on the said rails, driving means for reciprocating said carriage, a pointed grooving tool hinged on said carriage, means to urge said tool into contact with the film of coating material on the metal panel during movement of the carriage in one direction and means to hold the tool out of contact with the film during the opposite movement of the carriage and means for moving the table supporting the plate transversely of the path of the tool after each stroke of the grooving tool.

4. An apparatus as defined in claim 3 wherein the means for moving the table supporting the plate is automatic and includes a manually adjustable feed screw and a threaded member secured on the under side of the said table and engaging said screw.

5. An apparatus as defined in claim 3 wherein the means for moving the table supporting the plate includes a rotatable feed screw and a cooperating threaded member secured on the underside of the said table, a toothed wheel mounted on one end of said feed screw and an adjustable throw lever having a pawl carried thereon for selective engagement with the teeth on the toothed wheel.

6. An apparatus as defined in claim 3 wherein the means for moving the table supporting the plate includes a rotatable feed screw having a toothed wheel on one end thereof, the said feed screw cooperating with a threaded member secured under the said table, a driven oscillating segment freely mounted on the feed screw and a solenoid operated dog carried by said segment for engagement with the said toothed wheel whereby when the solenoid is energized the dog engages a tooth on the wheel.

7. An apparatus for cutting a series of parallel spaced and adjacent grooves in a film of coating material applied to a plate which includes a horizontal support for the plate, a carriage reciprocable over the plate and parallel to the surface thereof, a cutting tool, pivot means securing said tool to said carriage for rocking about a horizontal axis transverse to the axis of reciprocation, a weight mounted to adjustably bear on said tool to apply selected tool pressure to said film, means to reciprocate said carriage and mechanism associated with said reciprocating means to lift the tool from the film in one direction of carriage reciprocation.

8. An apparatus for cutting a series of grooves in a film of coating material applied to a plate, comprising a horizontal support for the plate, horizontal rails positioned above the plane of said support, a reciprocable carriage adapted to ride on said rails, power means for driving the carriage, a lever having a lost motion connection with said carriage to form a connection between said carriage and power means, a tool holder pivotally attached to the carriage having a cutting tool mounted therein, the cutting tool being arranged to contact the coating material on the plate during movement of the carriage in one direction, means including a cam surface on the pivoted tool holder and a moveable stud on the pivoted driving lever for raising the pivoted tool holder and cutting tool from contact with the plate during movement of the carriage in the opposite direction.

9. An apparatus for testing the adhesion of a film of coating material on an adjustable metallic test plate comprising in combination a metallic cutting tool, a reciprocating means for moving said tool in cutting position across said film to contact with said test plate, a mechanical feed device for changing the position of the test plate transversely with respect to the path of the cutting tool, an electric circuit including said tool and test plate, a solenoid operated switch which is closed when the solenoid is energized by the tool contacting the test plate, and a second circuit including said switch and a second solenoid controlling said feed device.

10. An apparatus for cutting grooves in a film of coating material applied to a metallic test plate including a metallic cutting tool, reciprocating drive means adapted to move said tool in a path for cutting through said film to contact with said plate, a slidable table for supporting the metallic test plate and electrically insulated therefrom, a feed screw threaded to the sliding table adapted to move the same transversely to the cutting stroke of the tool upon operation of the feed screw, means for rotating the feed screw including a toothed wheel affixed to the feed screw, a pivoted plate oscillatable from the drive means and carrying a solenoid, a pivoted dog on said oscillatable plate normally biased out of engagement with said toothed wheel but adapted to be moved into engagement with the solenoid when energized and a circuit including a source of power, said solenoid and a circuit closer adapted to be actuated by contact between said test plate and said tool whereby the solenoid is energized.

11. An apparatus as defined in claim 10 wherein a manually adjustable arcuate shield is freely mounted on the feed shaft and extends axially thereof between the pivoted dog and the toothed wheel whereby the dog is permitted to engage the toothed wheel only after the plate has oscillated sufficiently to carry the dog beyond the end of the arcuate shield.

12. An apparatus as defined in claim 3 wherein the grooving tool is mounted in a rod socket carried by the slidable carriage and means for automatically giving limited rotative movement to the rod socket, said means being constructed and arranged to effect such movement during the period the grooving tool is out of contact with the test film.

13. An apparatus for testing the adhesive characteristics of a film of coating material defined in claim 1 wherein the cutting tool has a conical point and means are provided for partially rotating the cutting tool about the axis of the point after the termination of each cutting stroke.

14. An apparatus for testing the adhesive characteristics of a film of coating material as defined in claim 1 wherein means are provided for applying a standard predetermined stress load to the cutting tool during its cutting periods.

15. An apparatus for testing the adhesive characteristics of a coating material as defined in claim 1 wherein adjustable means are provided for applying a standard stress on the cutting point of the tool during successive grooving operations and means are provided for presenting a new surface of the tool prior to each successive grooving operation.

DAVID M. WILLIAMS.

REFERENCES CITED

The following references are of record in the file of this patent:

UNITED STATES PATENTS

| Number | Name | Date |
| --- | --- | --- |
| 895,980 | Derichon | Aug. 11, 1908 |
| 1,458,529 | Hill | June 12, 1923 |
| 1,841,167 | Weinberg | Jan. 12, 1932 |
| 2,189,589 | Mahannah et al. | Feb. 6, 1940 |
| 2,300,107 | Curado et al. | Oct. 27, 1942 |
| 2,311,430 | Beno | Feb. 16, 1943 |
| 2,373,200 | Simmons et al. | Apr. 10, 1945 |